(12) United States Patent
Amzal

(10) Patent No.: US 11,461,333 B2
(45) Date of Patent: Oct. 4, 2022

(54) VERTICAL UNION OF FEATURE-BASED DATASETS

(71) Applicant: Business Objects Software LTD, Dublin (IE)

(72) Inventor: Mokrane Amzal, Courbevoie (FR)

(73) Assignee: BUSINESS OBJECTS SOFTWARE LTD., Dublin (IE)

(*) Notice: Subject to any disclaimer, the term of this patent is extended or adjusted under 35 U.S.C. 154(b) by 238 days.

(21) Appl. No.: 16/247,792

(22) Filed: Jan. 15, 2019

(65) Prior Publication Data

US 2020/0226130 A1 Jul. 16, 2020

(51) Int. Cl.
*G06F 16/2455* (2019.01)
*G06N 20/00* (2019.01)
*G06K 9/62* (2022.01)
*G06F 16/22* (2019.01)

(52) U.S. Cl.
CPC ........ *G06F 16/2456* (2019.01); *G06F 16/221* (2019.01); *G06K 9/6217* (2013.01); *G06N 20/00* (2019.01)

(58) Field of Classification Search
CPC .............. G06F 16/221; G06F 16/2456; G06F 16/2455; G06F 16/22; G06F 17/30; G06F 16/3334; G06F 16/334; G06F 16/353; G06F 16/335; G06F 16/24578; G06F 16/285; G06F 16/93; G06F 17/241; G06F 17/18; G06F 16/35; G06F 16/33; G06F 17/24; G06F 16/284; G06K 9/6217; G06K 9/62; G06K 16/00; G06K 9/629; G06N 20/00; G06N 3/02; G16H 20/00

USPC ......... 707/714, 718, 620, E17.017, 756, 802
See application file for complete search history.

(56) References Cited

U.S. PATENT DOCUMENTS

| | | | | |
|---|---|---|---|---|
| 6,167,399 | A  * | 12/2000 | Hoang ................ | G06F 16/2456 707/999.005 |
| 6,615,206 | B1 * | 9/2003 | Jakobsson ........... | G06F 16/2456 707/999.003 |
| 7,822,710 | B1 * | 10/2010 | Miller .................. | G06F 16/907 707/643 |
| 9,305,065 | B2 * | 4/2016 | Weyerhaeuser .. | G06F 16/24524 |
| 2005/0177553 | A1 * | 8/2005 | Berger ................ | G06F 16/283 |
| 2006/0184464 | A1 * | 8/2006 | Tseng .................. | G06N 5/003 707/E17.084 |
| 2007/0106643 | A1 * | 5/2007 | Croft ................... | G06F 16/283 |
| 2007/0118498 | A1 * | 5/2007 | Song ................... | G06F 16/337 |
| 2008/0313355 | A1 * | 12/2008 | Prasad ................ | G06F 16/27 709/248 |
| 2009/0276449 | A1 * | 11/2009 | Syed .................. | G06F 16/2453 707/999.101 |

(Continued)

*Primary Examiner* — Phong H Nguyen
(74) *Attorney, Agent, or Firm* — Buckley, Maschoff & Talwalkar LLC

(57) ABSTRACT

Provided is a system and method for combining feature sets of data via single vertical union operation. In one example, the method may include receiving a plurality of tables corresponding to a plurality of features observed from a dataset for use in machine learning, identifying columns of features within the plurality of tables which are to be combined, concatenating the identified columns of the features based on a union operation which sequentially appends the identified columns to each other, and storing the concatenated columns of the features as a combined dataset.

18 Claims, 6 Drawing Sheets

(56) References Cited

U.S. PATENT DOCUMENTS

| | | | |
|---|---|---|---|
| 2009/0287737 A1* | 11/2009 | Hammerly | G06F 16/288 |
| | | | 707/999.103 |
| 2012/0005190 A1* | 1/2012 | Faerber | G06F 16/24524 |
| | | | 707/718 |
| 2013/0290293 A1* | 10/2013 | Weyerhaeuser | G06F 16/24524 |
| | | | 707/E17.017 |
| 2017/0116237 A1* | 4/2017 | Zhang | G06F 16/254 |
| 2017/0329786 A1* | 11/2017 | Chow | G06F 3/04817 |
| 2018/0018579 A1* | 1/2018 | Xu | G06N 20/00 |
| 2019/0179936 A1* | 6/2019 | Javitt | G06F 16/2282 |
| 2020/0334246 A1* | 10/2020 | Chen | G06F 16/29 |

* cited by examiner

VERTICAL UNION OF FEATURE-BASED DATASETS

BACKGROUND

Feature engineering is a process of constructing explanatory variables (i.e., features) from one or more datasets (raw data) which can be used to train a machine learning model for solving a prediction problem. Machine learning requires a single table for training. Therefore, feature engineering requires consolidating all possible features (and tables thereof) into a single table that can be used for training. Automated feature engineering improves upon a standard machine learning workflow by automatically extracting useful and meaningful features from a set of related data tables with a framework that can be applied to any problem. Automated feature engineering not only cuts down on the time spent feature engineering, but creates interpretable features and prevents data leakage by filtering time-dependent data. In some cases, automated feature engineering can identify hundreds or even thousands of possible features (and tables) for use in training a model.

When a database is the initial source of data for engineering features, database tables of features are typically merged together using structured query language (SQL) commands. In particular, SQL join operations may be used to join datasets into a single data set with new columns that contain variables for modeling. A join operation, however, requires two tables to be merged based on one or more rules (e.g., inner join, left join, right join, full join, etc.). Such rules make it difficult to perform multiple join operations at the same time. Furthermore, combining all new variables into a single dataset using join operations can require significant processing resources and time. Furthermore, this process does not scale well with certain databases where a maximum number of joins may be limited to a predetermined number (e.g., 255 or less). Accordingly, a new mechanism is needed for combining tables of features within a database.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
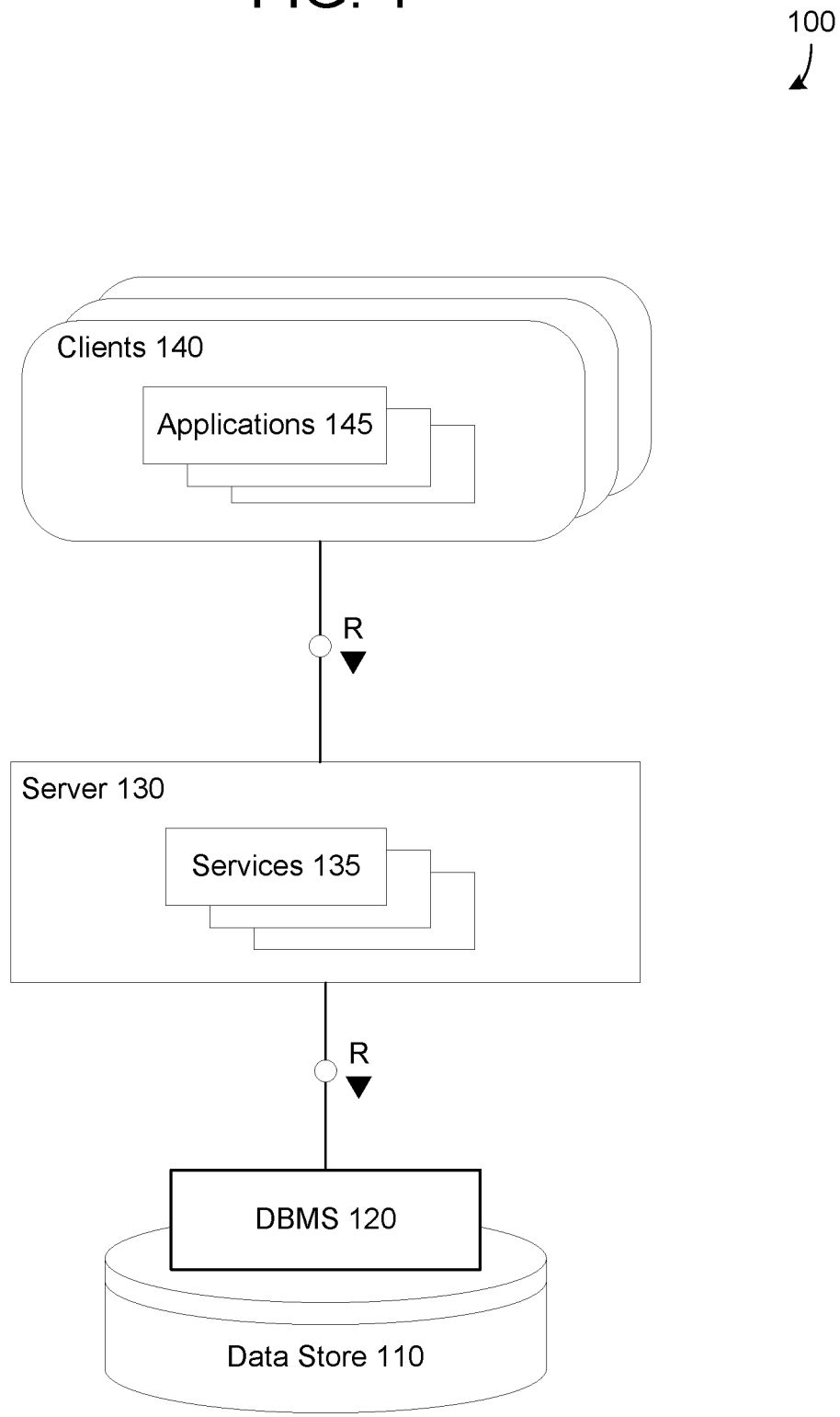
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Databases rely on different types of join operations such as left, right, inner, outer, etc., which each require different rules for combining two tables of data often relying on matching records together between the tables based on the different rules. When a database needs to combine many tables (e.g., hundreds, etc.), the system usually implements a chain of join operations. This process is inefficient and is limited in its scalability because some databases limit the number of join operations that can be performed. Furthermore, combining all new variables into a single dataset using join operations can require significant processing resources and time.

The example embodiments improve upon the drawbacks of the related art by combining database tables of features using a structured query language (SQL) script operator referred to as the vertical union. The system herein may concatenate columns of features together to generate a single database dataset (of many features) which can be used to train a predictive model. A large amount of features can each be computed separately (in parallel) as respective columns of data, and then merged together with a single SQL vertical union operation rather than relying on a long chain of SQL join operations as is done in the related art. For example, automated feature engineering may be performed to generate many tables of feature data. As a result, the example embodiments reduce the number of operations and resources needed to create a single dataset from many columns of features. Furthermore, the example embodiments are not limited by a maximum number of join operations allowed by a database because the example embodiments do not rely on join operations.

Rather than require matching of records between tables, the example embodiments concatenate columns (tables) together without the need for a join operation or rules governing join operations. As a result, many different columns can be combined simultaneously through a single vertical union operation without the need for a chain of operations to be executed sequentially. Furthermore, the features may be simultaneously observed using different processing nodes to fully take advantage of a multi-node database. Accordingly, features may be identified during a first step and combined into a single dataset during a second step. The vertical union operation is a SQL script operator and not a SQL database command such as a join or an aggregate.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis of analytical data output to a user interface on a display of the client 140 which allows the user to view analytical information such as charts, graphs, tables, and the like, based on the underlying data stored in the data store 110. The application 145 may pass analytic information based on the input to one of services 135. A structured query language (SQL) script may be generated based on the request and forwarded to DBMS 120. DBMS 120 may execute the SQL script to return a result set based on data of data store 110, and the application 145 creates a report/visualization based on the result set. As another example, the analytic data may be input by the user and provided directly from the application 145 to the DBMS 120 or the data store 110.

According to various embodiments, an application 145 and/or a service 135 may be used to identify and combine features for training a machine learning model. Raw data from various sources may be stored in the data store 110. In this example, the application 145 and/or the service 135 may extract core features from the raw data and also derive features from the core features. For example, when combined into a single dataset, a feature may be assigned to one or more columns of data. In one example, the features may be observed as numerical values. Furthermore, the application 145 and/or the service 135 may merge or otherwise combine features based on a vertical union operation. In this example, the application 145 and/or the service 135 may combine features from a plurality of database tables into a single table which is then stored in the data store 110.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing feature data that is observed from an initial dataset. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

According to various embodiments, data items (e.g., data records, data entries, etc.) may be stored, modified, deleted, and the like, within the data store 110. As an example, data items may be created, modified, or deleted based on instructions from any of the applications 145, the services 135, and the like. Each data item may be assigned a globally unique identifier (GUID) by an operating system, or other program of the database 100. The GUID is used to uniquely identify that data item from among all other data items stored within the database 100. GUIDs may be created in multiple ways including, but not limited to, random, time-based, hardware-based, content-based, a combination thereof, and the like. Examples of conventions for creating GUIDs are described in RFC 4122. For example, in the random number GUID creation, a random-number generator may be used to create a GUID (e.g., a 128-bit number, etc.) As another example, a time-based GUID may be created based on a current time detected from a system clock. Hardware-based GUIDs may be generated based on a MAC address of a network card, etc. As another example, content-based GUIDs may be created based on a hash of the file contents.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Join operations can be used to merge together tables of data especially when the tables include one or more features that are related. Different types of joins require different rules. Because a join is based on a match between content of the table data, the join operations are performed one at a time. Therefore, when a database needs to combine many database tables of content together, the database must execute many join operations, in sequence, thereby allowing the previous join operation to finish before implementing the next join operation. The system described herein overcomes this problem and reduces the number of operations needed to combine many database tables into a single operation, the vertical union.

The vertical union operator is not based on an SQL command such as join, but is instead based on a SQL script operation. Furthermore, in situations where the number of join operations capable of being processed by the database is limited to a predetermined number (e.g., 255 or less), the system herein is not limited because it does not rely on join operations. The advantage of the example embodiments is the ability to more quickly and efficiently combine a high number of features (such as those acquired through automated feature engineering) into a single database table for use with training a machine learning model. In some embodiments, the system may order all columns containing the features according a same order such as based on a key which identifies uniquely each row of the original dataset. In some embodiments, the system may also perform a sort operation in parallel on each of the database tables with on contention. This allows the system to leverage a multi-node and multi-core architecture for large scale feature engineering.

Figure 2:
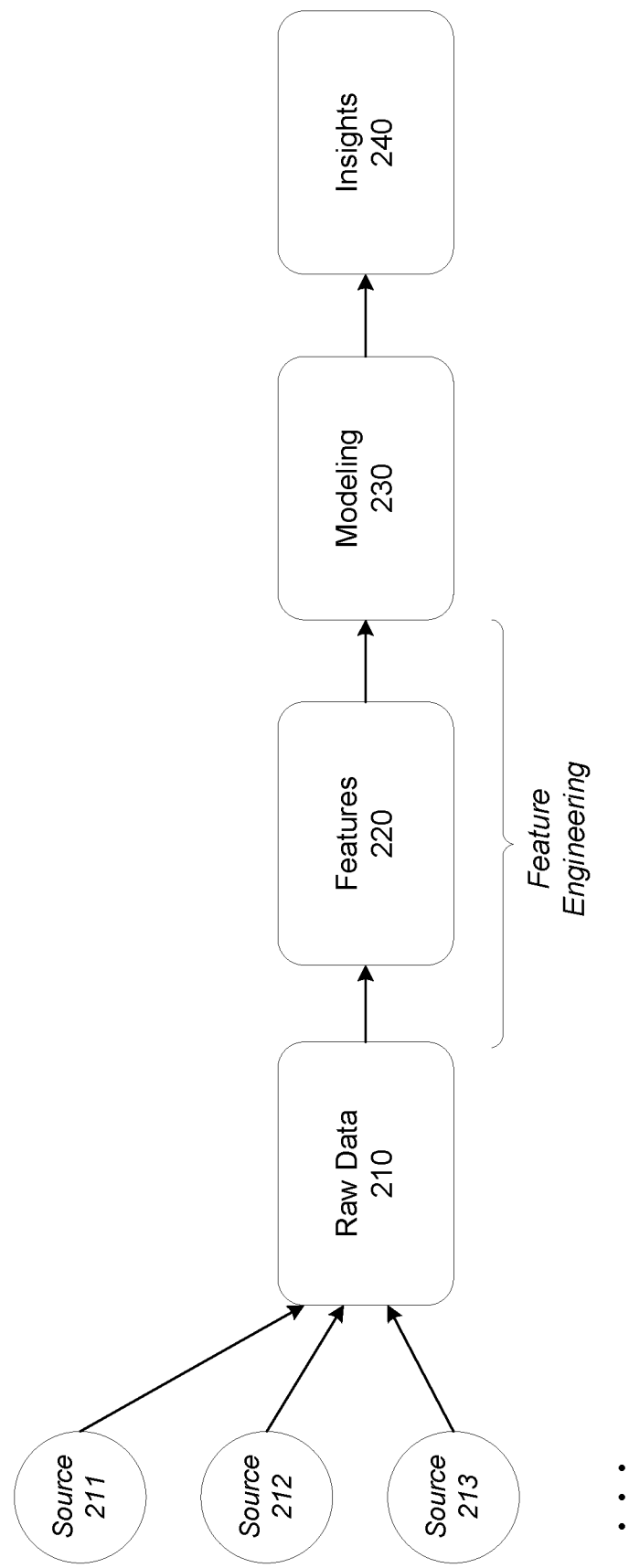
FIG. 2 is a diagram illustrating a machine learning workflow in accordance with an example embodiment.

FIG. 2 illustrates a machine learning workflow 200 in accordance with an example embodiment. Referring to FIG. 2, raw data 210 is acquired from a plurality of data sources 211-213, and converted into features for use in modeling 230 of a machine learning algorithm which can then be used to create insights/predictions based on live data. Machine learning fits mathematical models to data in order to derive insights or make predictions. These models take features as input.

The raw data 210 may be observations of real-world phenomena. For instance, personal biometric data can include measurements of minute-by-minute heart rate, blood sugar level, blood pressure, etc. Each piece of data provides a small window into a limited aspect of reality. The collection of all of these observations gives us a picture of the whole. But the picture is messy because it is composed of a thousand little pieces, and there's always measurement noise and missing pieces.

In machine learning and pattern recognition, a feature is an individual measurable property or characteristic of a phenomenon being observed. Choosing informative, discriminating and independent features is a crucial step for effective algorithms in pattern recognition, classification and regression. Features are usually numeric, but structural features such as strings and graphs are used in syntactic pattern recognition. The concept of a feature is related to that of explanatory variable used in statistical techniques such as linear regression There are many ways to turn raw data into numeric measurements (features), which is why the features 220 can end up looking like a lot of things. Naturally, features 220 must derive from the type of data that is available. In addition, the features 220 are also tied to the model. Some models are more appropriate for some types of features, and vice versa. The right features are relevant to the task at hand and should be easy for the model to ingest. Feature engineering is the process of formulating the most appropriate features given the data, the model, and the task. The number of features is also important. If there are not enough informative features, then the model will be unable to perform the ultimate task. If there are too many features, or if most of them are irrelevant, then the model will be more expensive to train, in terms of computer resource consumption, without improving its predictive performance (accuracy or error rate metrics for instance).

Automated feature engineering can significantly reduce the time expended identifying possible features from the raw data 210 by extracting feature sets and storing the feature sets as database tables. Here, each feature may be a database table. Before the features can be used in the modeling 230 for training a predictive model, the features must be combined into a format that can be used for training. This format requires a single table of columns. The example embodiments provide a new mechanism for combining tables of features into a single dataset, referred to herein as a vertical union. The vertical union is based on an SQL script operation rather than a traditional SQL database command such as join.

After the features have been combined into a single dataset, the database may train the model through the modeling process 230. In the machine learning workflow 200, the user or the system may pick not only the model, but also the features. This is a double-jointed lever, and the choice of one affects the other. Good features make the subsequent modeling step easy and the resulting model more capable of completing the desired task. Meanwhile, bad features may require a much more complicated model to achieve the same level of performance.

Figure 3A:
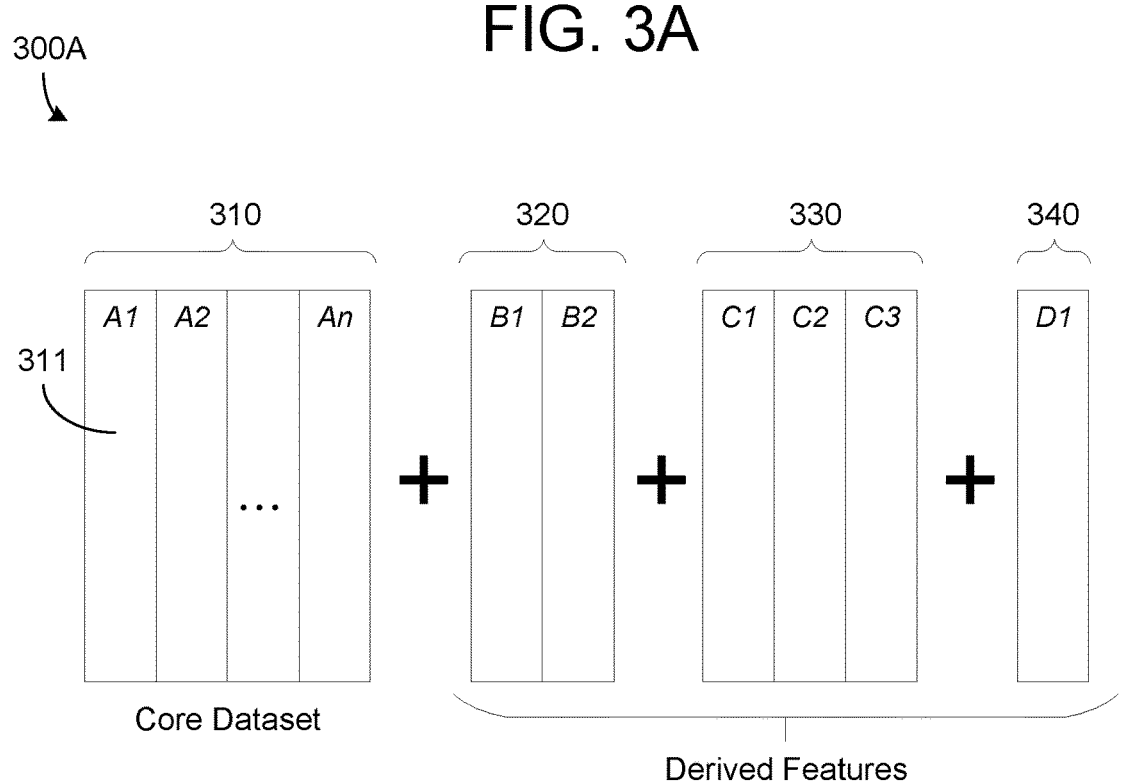
FIG. 3A is a diagram illustrating a plurality of tables of features in accordance with example embodiment.
Figure 3B:
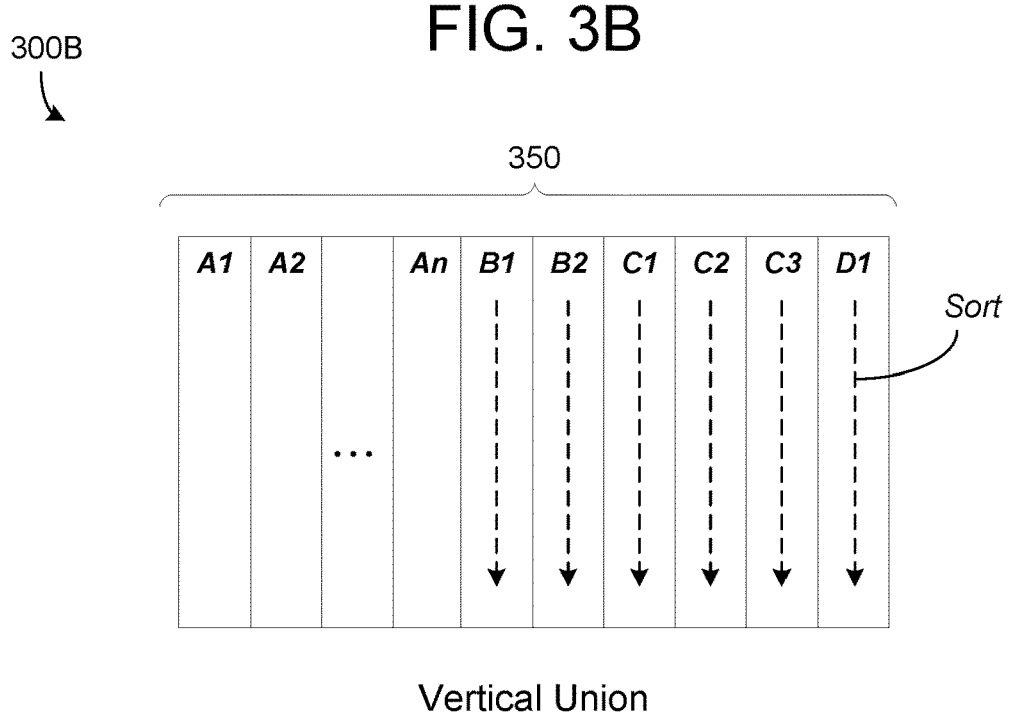
FIG. 3B is a diagram illustrating a vertical union of a plurality of tables of features in accordance with an example embodiment.

FIG. 3A illustrates a process 300A of identifying a plurality of tables of features in accordance with example embodiment, and FIG. 3B illustrates a process 300B of a vertical union of the plurality of tables of features in accordance with an example embodiment. In the process of creating a predictive model for classifying, clustering, recommending, etc., there is a process of preparing a dataset for use in training a machine learning algorithm. Predictive data preparation is an important step. Automated feature recognition tools can identify different features from an initial data set. The features may be stored in respective database tables. In the example of FIG. 3A, a core dataset 310 (initial dataset) is identified and includes a plurality of columns of data which are included in a database table. In addition, the system may also derive a number of features from the core dataset 310 and store in the derived features in respective tables such as tables 320, 330, and 340. Here, each of the derived features are stored in tables 320, 330, and 340, which each include columns of feature data.

Before the core dataset 310 and the derived features 320, 330, and 340 can be analyzed for modeling, they must be combined into a single table. Typically, a database combines tables using SQL joins which are a generic mechanism which combines a first table with a second table based on one or more join rules. In order to combine four tables together, three or more join operations must be performed. For example, a first two tables may be combined to generate a first result using a first join operation, a third table may be combined with the first result using a second join operation to create a second result, and a fourth table may be combined with the second result using a third join operation to generate a third result. As will be appreciated, the more tables of features to be combined, the greater the number of join operations and thus the slower the processing.

The example embodiments overcome this problem through the use of an SQL script vertical union operation such as shown in the process 300B of FIG. 3B. Here, data from multiple database tables is transformed into a single table by concatenating columns together independent of join rules or matching of content. As a result, many tables of feature data can be concatenated through a single operation rather than waiting for a previous join to be performed. That is, the example embodiments do not rely on classic joins, but rather a vertical union operation which enables the database to merge features (columns) and extend the raw data set (core dataset 310) with new columns (derived features 320, 330, and 340). With the new approach, the database can create a single database table 350 as shown in FIG. 3B, through execution of a single operation rather than a long chain of join operations. Moreover, the system is not limited by a restriction on the number of joins that can be processed by a database. In some embodiments, before or during the combining, the features 320, 330, and 340 may be sorted to match a key of the core dataset 310.

Figure 4:
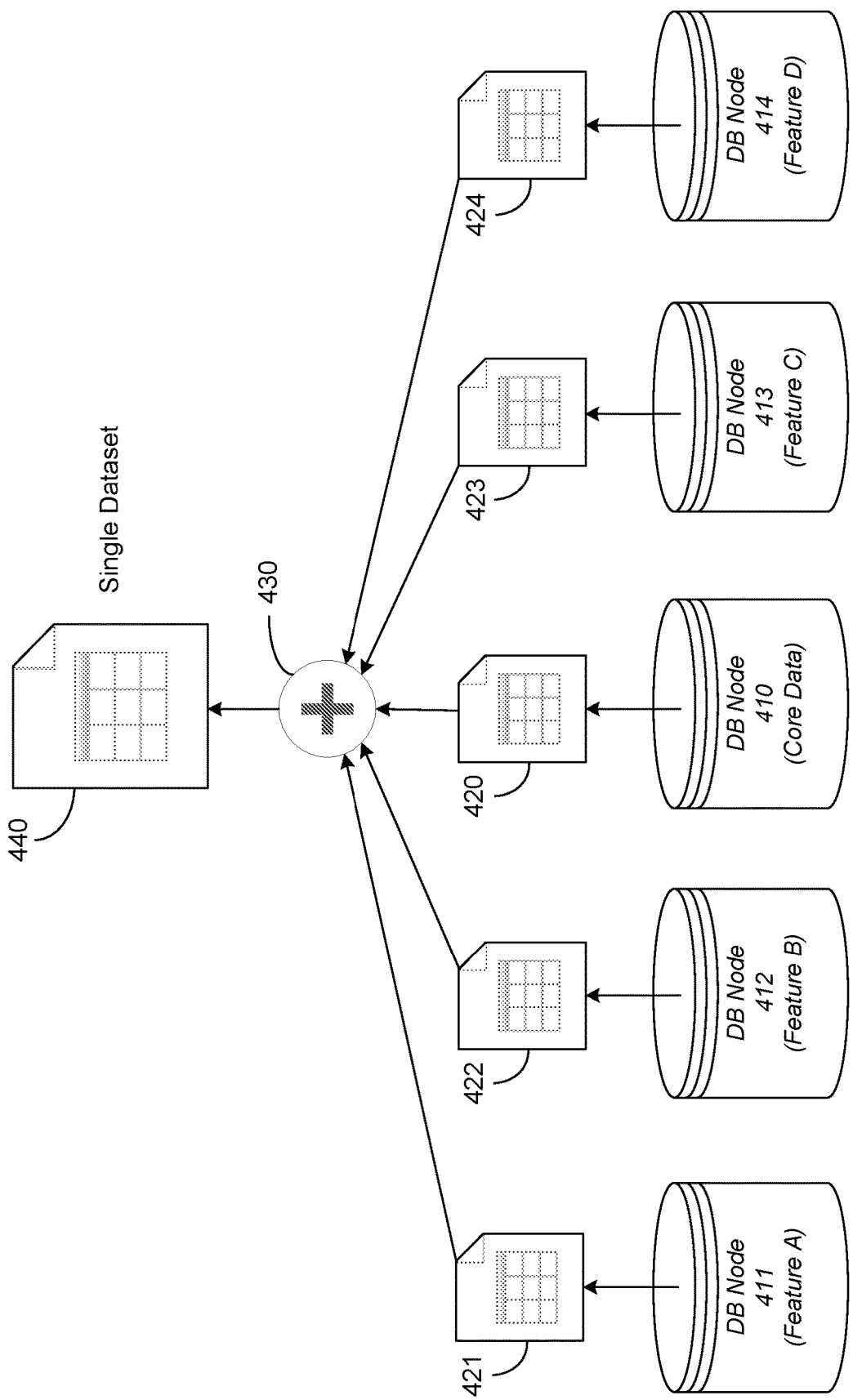
FIG. 4 is a diagram illustrating of a process of merging feature sets independently generated in accordance with an example embodiment.

FIG. 4 illustrates a process 400 of merging feature sets independently generated in accordance with an example embodiment. Referring to FIG. 4, a database node 410 manages access to a core dataset 420 including original raw features of data. In addition, database nodes 411-414 may derive features from the core dataset 420. In this example, each of the database nodes 411-414 may identify/derive features at the same time as one another (i.e., in parallel with one another). For example, each of the database nodes 411-414 may generate features from underlying core data stored in the core dataset 420. Furthermore, each of the database nodes 411-414 may create respective tables 421-424 of feature data. The database may then use a vertical union operation 430 to combine the created tables 421-424 together with the core dataset 420 during a single operation. The result is a single dataset 440 with multiple features which can be used for training a machine learning model.

According to various embodiments, a database may use a SQL script operation instead of SQL queries, to combine datasets. The database can replace SQL join operations with an SQL script vertical union. Therefore, instead of having to execute a long chain of joins, each group of features may be computed independently and combined with a single operation in the end. This changes the way the database is working on the data. The feature set derivations may be generated in parallel, and then a single merge operation can be performed to combine the features with the original data set. In some embodiments, the feature set data can be sorted prior to or during the union.

Therefore, the database can compute all features independently at the same time, and then join them with a single vertical union operation. The example embodiments leverage the performance capabilities of a multi-nodal database or a multi-core processor to improve processing performance of the merging. There are two aspects, there are a number of rules and the number of features (columns) that you bring to your data set. If you want to create models with good performance, you want more and more features (columns) which are indicators. An automated feature learning engine can be used to sort through the identified features to identify which features are most useful. Therefore, the system herein may desire to have as many possible features from the dataset meaning that many database tables may need to be combined.

Prior to the training data being sent for training a machine learning model, the database may produce a single data set with many columns which are concatenated together (i.e., appended instead of joined) which is then given to the automated algorithm engine which learns from the data (training phase and inference phase).

Figure 5:
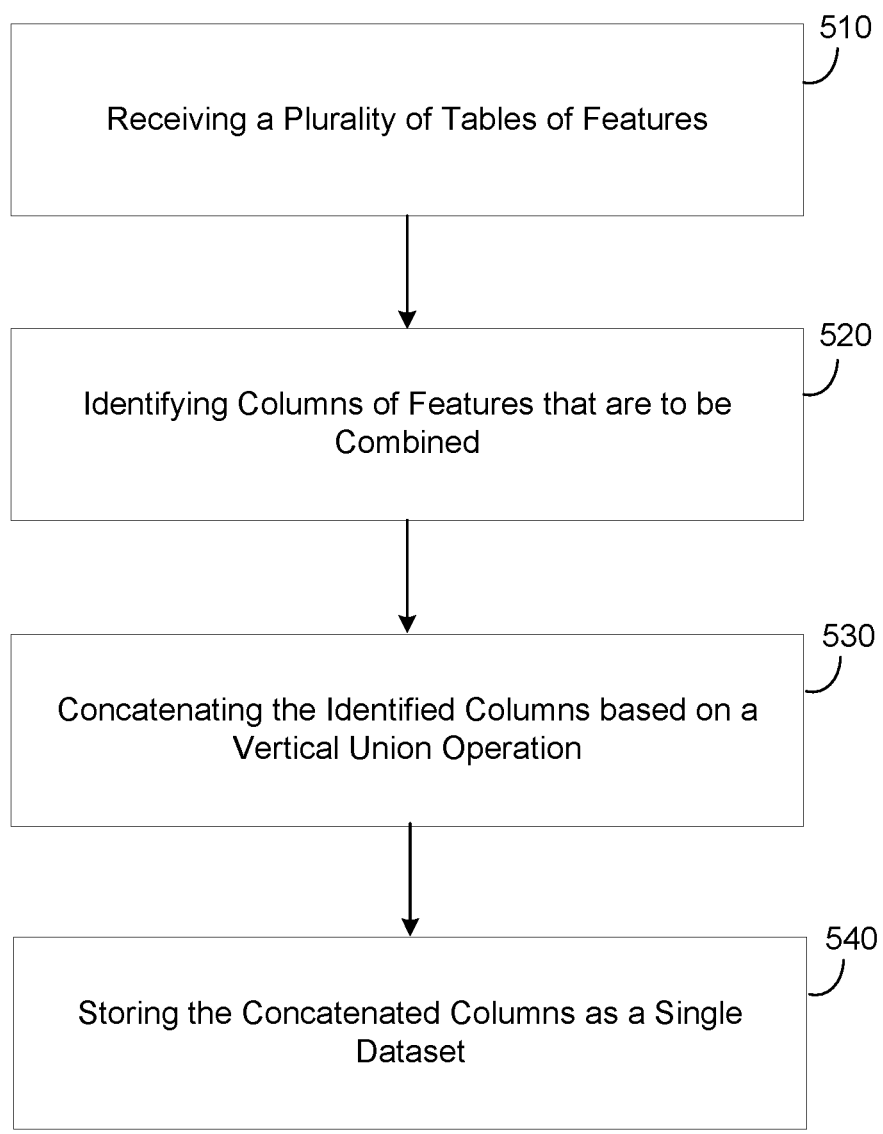
FIG. 5 is a diagram illustrating a method of combining feature sets of data in accordance with an example embodiment.

FIG. 5 illustrates a method 500 of combining feature sets of data in accordance with an example embodiment. For example, the method 500 may be performed by a database node, a cloud platform, a server, a computing system (user device), a combination of devices/nodes, or the like. Referring to FIG. 5, in 510, the method may include receiving a plurality of tables corresponding to a plurality of features observed from a dataset for use in machine learning. A database table may include a one-dimensional or a multi-dimensional table of feature data. The table may include one or more columns and a plurality of rows of data. Each table may be associated with one feature, however, embodiments are not limited thereto. In the case of a large dataset, the number of tables may be in the hundreds, thousands, etc. In some embodiments, prior to the receiving, the method may include simultaneously extracting the plurality of features from an initial dataset and storing the plurality of features within the plurality of tables, respectively.

To perform training of a machine learning model, the tables of features should be combined into a single table. According to various embodiments, the method 500 may perform a vertical union based on an SQL script operation rather than rely on traditional SQL database commands such as join and aggregate. In 520, the method may include identifying columns of features within the plurality of tables which are to be combined. In 530, the method may include concatenating the identified columns of the features based on a vertical union operator which sequentially appends the identified columns to each other rather than requiring a join operation with matching rules. In 540, the method may include storing the concatenated columns of the features as a combined dataset.

For example, the identifying may include identifying core columns of features that are extracted from raw data and derived columns of features that are derived from the core columns of features. In some embodiments, the concatenating may include appending the derived columns of features to the core columns of features. In some embodiments, the concatenating may include simultaneously concatenating at least three columns of independent features based on a single vertical union operation. For example, the concatenating may append X number of identified columns of features to Y number of identified columns of features to generate a total of X+Y number of columns of features in the combined dataset. In some embodiments, the method may further include transmitting the combined dataset including the concatenated columns to a training module in a machine learning pipeline configured to identify features for a machine learning problem.

Figure 6:
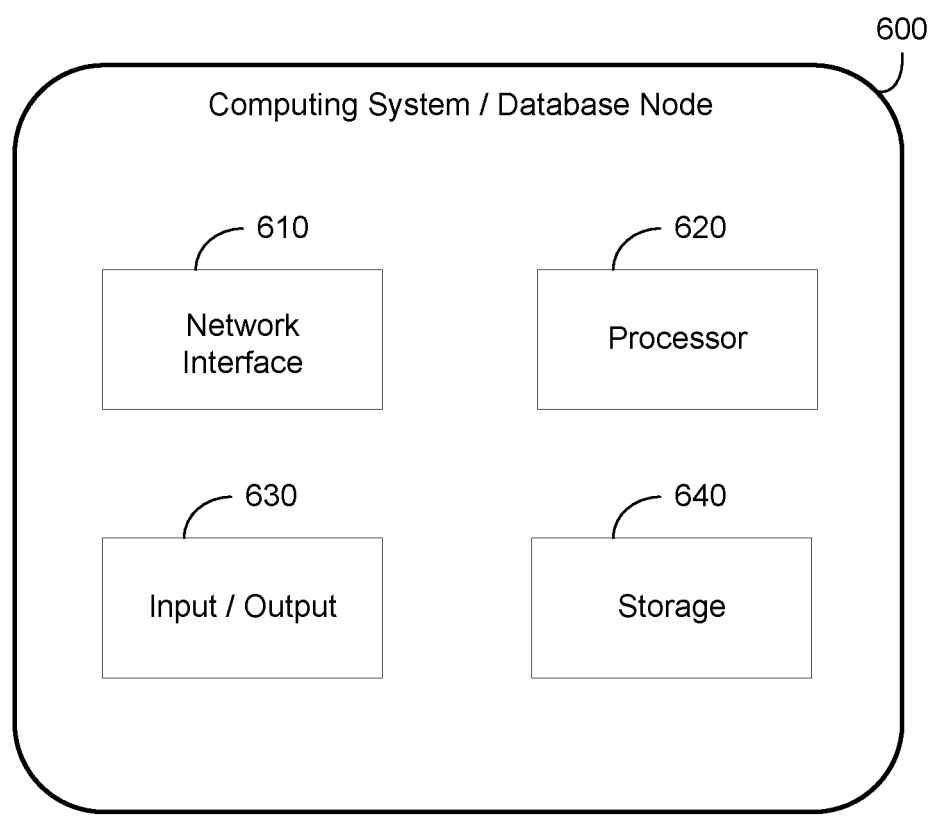
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. The storage 640 may be used to store database records, items, entries, and the like.

According to various embodiments, the processor 620 may receive a plurality of tables corresponding to a plurality of features observed from a dataset for use in machine learning. In some embodiments, the processor 620 may also extract the features from an initial dataset and store the features within the plurality of tables. The processor 620 may identify columns of features within the plurality of tables which are to be combined, and concatenate the identified columns of the features based on a vertical union operation which sequentially appends the identified columns to each other. That is, instead of using a SQL join command, the example embodiments may concatenate columns of features together based on a vertical union operation of SQL script without the need or complexity of a long sequential chain of joins. The storage 640 may store the concatenated columns of the features as a combined dataset.

In some embodiments, the processor 620 may identify core columns of features that are extracted from raw data and derived columns of features that are derived from the core columns of features. In some embodiments, the processor 620 may append the derived columns of features to the core columns of features. In some embodiments, the processor 620 may simultaneously concatenate at least three columns of independent features based on a single vertical union operation. Here, the processor 620 may concatenate the identified columns together based on a SQL script operation without the use of a SQL join operation. For example, in a case where the processor 620 appends X number of identified columns of features to Y number of identified columns of features, the resulting dataset may include a total of X+Y number of columns of features in the combined dataset.

The columns may be independently joined without regard to the content stored within the columns. For example, the columns may be joined without the need to conduct matching rules between content of the columns as required by a join operation. In some embodiments, the processor 620 may transmit the combined dataset including the concatenated columns to a training module configured to identify features for a machine learning problem. In response, the training module may process the many features to identify which features are more tailored to solving the particular prediction problem. For example, the training module may reduce the large set of features down to a few which can then be used to create the machine learning algorithm.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a processor configured to
   receive a database table comprising a plurality of columns of features observed from a dataset,
   derive a plurality of additional database tables of feature data based on the received database table via an automated feature engineering process, wherein the plurality of additional database tables are generated from manipulations of the plurality of columns of feature data in the received database table, and each additional database table includes a plurality of derived columns of feature data,
   execute a structured query language (SQL) script operation that vertically appends the received database table of feature data and the plurality of additional database tables which each include a plurality of columns of derived feature data together within a single database table of features,
   sort the plurality of columns of derived features values within the plurality of additional database tables based on an arrangement of the plurality of columns of features within the received database table while vertically appending the plurality of columns of features from the received database table and the plurality of additional columns of derived feature data together within the single database table of features via the SQL script operation; and
   input the single database table of features into a machine learning model to train the machine learning model.

2. The computing system of claim 1, wherein the processor is further configured to simultaneously extract the plurality of columns of features and derive the plurality of additional database tables of feature data, respectively.

3. The computing system of claim 1, wherein the processor is configured to identify core columns of feature data extracted from the received database table and derive the plurality of additional database tables of feature data from the core columns of feature data.

4. The computing system of claim 1, wherein the processor is configured to simultaneously concatenate a plurality of columns of features from each of three different additional database tables into the single table of features based on a vertical union operator within the SQL script operation.

5. The computing system of claim 1, wherein the processor is configured to append X number of identified columns of features from the received database table to Y number of identified columns of features from an additional database table to generate a total of X+Y number of columns of features arranged side-by-side in the single table of columns of features, where both X and Y are greater than one.

6. The computing system of claim 1, wherein the processor is further configured to input the single table into the machine learning model during execution of the machine learning model to generate a trained machine learning model.

7. The computing system of claim 1, wherein the processor is further configured to transmit the single table to a training module configured to identify features for a machine learning problem.

8. A method comprising:
   receiving a database table comprising a plurality of features observed from a dataset;
   deriving a plurality of additional database tables of feature data based on the received database table via an automated feature engineering process, wherein the plurality of additional database tables are generated from manipulations of the plurality of columns of feature data in the received database table, and each additional database table includes a plurality of derived columns of feature data;
   executing a structured query language (SQL) script operation that vertically appends the received database table of feature data and the plurality of additional database tables which each include a plurality of columns of derived feature data together within a single database table of features;
   sorting the plurality of columns of derived features values within the plurality of additional database tables based on an arrangement of the plurality of columns of features within the received database table while vertically appending the plurality of columns of features from the received database table and the plurality of additional columns of derived feature data together within the single database table of features via the SQL script operation; and
   inputting the single database table of features into a machine learning model to train the machine learning model.

9. The method of claim 8, wherein the method further comprises simultaneously extracting the plurality of columns of feature data and derive the plurality of additional database tables of derived feature data, respectively.

10. The method of claim 8, wherein the identifying comprises identifying core columns of feature data extracted from the received database table and derive the plurality of additional database tables of feature data from the core columns of feature data.

11. The method of claim 8, wherein the executing comprises simultaneously concatenating a plurality of columns of features from each of three different additional database tables into the single table of features based on a vertical union operator within the SQL script operation.

12. The method of claim 8, wherein the executing comprises appending X number of identified columns of features from the received database table to Y number of identified columns of features from an additional database table to generate a total of X+Y number of columns of features arranged side-by-side in the single table of features, where both X and Y are greater than one.

13. The method of claim 8, wherein the method further comprises inputting the single table into the machine learning model during execution of the machine learning model to generate a trained machine learning model.

14. The method of claim 8, further comprising transmitting the single table to a training module configured to identify features for a machine learning problem.

15. A non-transitory computer-readable medium storing instructions which when executed cause a computer to perform a method comprising:
- receiving a database table comprising a plurality of features observed from a dataset;
- deriving a plurality of additional database tables of feature data based on the received database table via an automated feature engineering process, wherein the plurality of additional database tables are generated from manipulations of the plurality of columns of feature data in the received database table, and each additional database table includes a plurality of derived columns of feature data;
- executing a structured query language (SQL) script operation that vertically appends the received database table of feature data and the plurality of additional database tables which each include a plurality of columns of derived feature data together within a single database table of features;
- sorting the plurality of columns of derived features values within the plurality of additional database tables based on an arrangement of the plurality of columns of features within the received database table while vertically appending the plurality of columns of features from the received database table and the plurality of additional columns of derived feature data together within the single database table of features via the SQL script operation; and
- inputting the single database table of features into a machine learning model to train the machine learning model.

16. The non-transitory computer-readable medium of claim 15, wherein the method further comprises simultaneously extracting the plurality of columns of feature data and derive the plurality of additional database tables of derived feature data, respectively.

17. The non-transitory computer-readable medium of claim 15, wherein the identifying comprises identifying core columns of feature data extracted from the received database table and derive the plurality of additional database tables of feature data from the core columns of feature data.

18. The non-transitory computer-readable medium of claim 15, wherein the executing comprises simultaneously concatenating a plurality of columns of features from three different additional database tables into the single table of features based on a vertical union operator within the SQL script operation.

* * * * *